(12) United States Patent
Bradley et al.

(10) Patent No.: US 10,468,849 B1
(45) Date of Patent: Nov. 5, 2019

(54) HYBRID OPTICAL WAVEGUIDES OF TELLURIUM-OXIDE-COATED SILICON NITRIDE AND METHODS OF FABRICATION THEREOF

(71) Applicant: McMaster University, Dundas (CA)

(72) Inventors: Jonathan Bradley, Oakville (CA); Andrew Knights, Dundas (CA); Henry Frankis, Hamilton (CA); Dawson Bonneville, Hamilton (CA); Khadijeh Miarabbas Kiani, Hamilton (CA)

(73) Assignee: MCMASTER UNIVERSITY, Hamilton, ON (CA)

( * ) Notice: Subject to any disclaimer, the term of this patent is extended or adjusted under 35 U.S.C. 154(b) by 0 days.

(21) Appl. No.: 16/205,827

(22) Filed: Nov. 30, 2018

(51) Int. Cl.
| | |
|---|---|
| *H01S 3/063* | (2006.01) |
| *G02B 6/122* | (2006.01) |
| *G02B 6/132* | (2006.01) |
| *G02B 6/136* | (2006.01) |
| *G02B 6/134* | (2006.01) |
| *H01S 3/16* | (2006.01) |
| *G02B 6/12* | (2006.01) |

(52) U.S. Cl.
CPC .......... *H01S 3/0637* (2013.01); *G02B 6/1223* (2013.01); *G02B 6/132* (2013.01); *G02B 6/134* (2013.01); *G02B 6/136* (2013.01); *H01S 3/163* (2013.01); *G02B 2006/12121* (2013.01); *G02B 2006/12147* (2013.01); *G02B 2006/12159* (2013.01); *G02B 2006/12173* (2013.01); *H01S 3/0635* (2013.01); *H01S 3/1608* (2013.01); *H01S 3/1613* (2013.01); *H01S 3/1616* (2013.01)

(58) Field of Classification Search
CPC ...... H01S 3/0637; H01S 3/163; H01S 3/1613; H01S 3/1608; H01S 3/1616; H01S 3/0635; G02B 6/134; G02B 6/136; G02B 6/132; G02B 6/1223; G02B 2006/12147; G02B 2006/12121; G02B 2006/12159; G02B 2006/12173
See application file for complete search history.

(56) References Cited

U.S. PATENT DOCUMENTS

| | | | |
|---|---|---|---|
| 9,325,140 B2 | 4/2016 | Purnawirman et al. | |
| 9,490,605 B2* | 11/2016 | Gaeta | H01S 3/06791 |
| 9,799,791 B2* | 10/2017 | Collins | G02B 6/13 |
| 9,806,485 B2 | 10/2017 | Purnawirman et al. | |

(Continued)

*Primary Examiner* — Andrew Jordan
(74) *Attorney, Agent, or Firm* — Hill & Schumacher (57) ABSTRACT

In various example embodiments, hybrid waveguide devices are disclosed based on a silicon nitride waveguide conformally coated with a tellurium oxide layer. A tellurium oxide layer is deposited over a silicon nitride waveguide such that the tellurium oxide layer forms a conformal layer that inherits the underlying shape of the silicon nitride waveguide, thereby forming a conformal raised region above the silicon nitride waveguide, while also forming planar regions that extend laterally from the silicon nitride waveguide. The present example hybrid waveguide structures enable the formation of a guided single mode that extends from the raised region of the tellurium oxide layer that resides above the silicon nitride waveguide into the silicon nitride waveguide, and the dimensions of the structure may be selected such that a majority of the optical mode is confined within the tellurium oxide layer, at least over a portion of the infrared region.

21 Claims, 8 Drawing Sheets

(56) References Cited

U.S. PATENT DOCUMENTS

| | | | |
|---|---|---|---|
| 2003/0046959 A1* | 3/2003 | Cognolato | G02B 6/13 65/386 |
| 2003/0231852 A1* | 12/2003 | Taylor | C03C 3/122 385/142 |
| 2007/0002431 A1* | 1/2007 | Chung | C03C 3/122 359/341.5 |
| 2007/0165993 A1* | 7/2007 | Kondo | G02B 6/122 385/129 |
| 2011/0311180 A1* | 12/2011 | Hu | G02B 6/132 385/14 |
| 2015/0140720 A1* | 5/2015 | Collins | G02B 6/13 438/65 |
| 2016/0134078 A1* | 5/2016 | Gaeta | H01S 3/06791 372/6 |
| 2016/0280586 A1* | 9/2016 | Jha | C03C 3/122 |
| 2018/0131155 A1 | 5/2018 | Purnawirman et al. | |

* cited by examiner

| Variables | Symbols | Possible Range |
|---|---|---|
| Silicon Oxide or Top Cladding Material Refractive Index* | $n_{SiO2}$ | 1.35 - 1.55 |
| Silicon Nitride or Silicon Oxynitride Refractive Index* | $n_{Si3N4}$ | 1.45 - 2.0 |
| Tellurium Dioxide Refractive Index* | $n_{TeO2}$ | 2.0-2.2 |
| Silicon Nitride Width | $w_{SiN}$ | 0.5 μm - 2.0 μm; alternatively 0.1 μm – 10 μm |
| Silicon Nitride Height | $h_{SiN}$ | 0.05 μm - 0.3 μm; alternatively 0.02 μm – 0.8 μm |
| Tellurium Dioxide Height | $h_{TeO}$ | 0.3 μm - 0.6 μm; alternatively 0.1 μm – 1 μm |
| Silicon Oxide Height | $h_{SiO2}$ | 2 - 8 μm |
| Silicon Substrate Height | $h_{Si}$ | N/A |

*Refractive indices given at 1550nm

FIG. 1C

| Reference | [Petra...] | [Madden] | [Madden] | This Work |
|---|---|---|---|---|
| Waveguide type | $TeO_2$ rib | $TeO_2$ rib | $TeO_2$:$Er^{3+}$ rib | $TeO_2$-coated $Si_3N_4$ strip |
| Single- or multi-mode | Multi-mode | Multi-mode | Single-mode | Single-mode |
| $TeO_2$ etch chemistry | Ar | $H_2$/$CH_4$/Ar | $H_2$/$CH_4$/Ar | No etch |
| Waveguide width (μm) | 4 | 4 | 2 | 1.2 |
| $TeO_2$ layer thickness (μm) | 1.1 | 1.8 | 1.88 | 0.38 |
| $TeO_2$ confinement factor (%) | 96 | 99 | 98 | 65 |
| Mode size (μm$^2$) | 6.3 | 4.5 | 5.5 | 1.16 |
| Minimum bend radius (mm) | > 1 | 0.35 | > 1 | 0.13 |
| Effective index | 1.97 | 2.04 | 2.03 | 1.84 |
| Waveguide propagation loss (dB/cm) | 5.7 | < 0.1[b] | 0.6 | 0.8 |

[a]All values determined at a wavelength of 1.55 μm except when noted
[b]Measured at 1.29 μm

HYBRID OPTICAL WAVEGUIDES OF TELLURIUM-OXIDE-COATED SILICON NITRIDE AND METHODS OF FABRICATION THEREOF

BACKGROUND

The present disclosure relates to photonics and integrated optical devices.

The current telecommunications industry is reaching limitations with respect to bandwidth, data throughput, and chip scalability as Moore's Law approaches its theoretical limitations. Silicon photonics addresses these issues by providing CMOS compatible integration of photonic components. However, a compact on-chip optical amplifier or laser source that properly addresses the needs of many applications has yet to be demonstrated.

SUMMARY

In various example embodiments, hybrid waveguide devices are disclosed based on a silicon nitride waveguide conformally coated with a tellurium oxide layer. A tellurium oxide layer is deposited over a silicon nitride waveguide such that the tellurium oxide layer forms a conformal layer that inherits the underlying shape of the silicon nitride waveguide, thereby forming a conformal raised region above the silicon nitride waveguide, while also forming planar regions that extend laterally from the silicon nitride waveguide. The present example hybrid waveguide structures enable the formation of a guided single mode that extends from the raised region of the tellurium oxide layer that resides above the silicon nitride waveguide into the silicon nitride waveguide, and the dimensions of the structure may be selected such that a majority of the optical mode is confined within the tellurium oxide layer, at least over a portion of the infrared region.

Accordingly, in a first aspect, there is provided an optical device comprising:
  a substrate;
  a first dielectric layer formed on said substrate, said first dielectric layer having a refractive index less than that of silicon nitride;
  a silicon nitride waveguide formed on said first dielectric layer; and
  a tellurium oxide layer conformally disposed over said silicon nitride waveguide such that said tellurium oxide layer extends laterally in a planar configuration on either side of said silicon nitride waveguide while forming a conformal raised region over said silicon nitride waveguide, such that said tellurium oxide layer and said silicon nitride waveguide form a hybrid optical waveguide.

In another aspect, there is provided a method of forming an optical device, the method comprising:
  providing a substrate having a dielectric layer thereon;
  forming a silicon nitride waveguide on the dielectric layer; and
  depositing a tellurium oxide layer over the silicon nitride waveguide, such that the tellurium oxide layer extends laterally in a planar configuration on either side of the silicon nitride waveguide while forming a conformal raised region over the silicon nitride waveguide, thereby forming a hybrid optical waveguide.

In another aspect, there is provided an optical device comprising:
  a substrate;
  a first dielectric layer formed on said substrate, said first dielectric layer having a refractive index less than that of silicon nitride;
  a silicon nitride waveguide formed on said first dielectric layer; and
  a metal oxide layer conformally disposed over said silicon nitride waveguide such that said metal oxide layer extends laterally in a planar configuration on either side of said silicon nitride waveguide while forming a conformal raised region over said silicon nitride waveguide, such that said metal oxide layer and said silicon nitride waveguide form a hybrid optical waveguide.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIGS. 6A-6D plot results from simulations based for the fundamental TE-polarized waveguide mode of the modeled tellurium-oxide-coated silicon nitride hybrid waveguide having a 0.2 μm height and 1.2 μm waveguide width and various tellurium oxide coating thicknesses (see legend in A), at wavelengths from 0.6 μm to 2 μm, showing (A)

effective index, (B) effective 1/e electric field area of the waveguide mode, (C) optical confinement of the mode in the tellurium oxide coating (solid) and the silicon nitride waveguide (dashed) and (D) minimum bend radius of the waveguide, defined as the radius above which radiation losses will exceed 0.1 dB/cm.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. Unless otherwise specified, the terms "about" and "approximately" mean plus or minus 25 percent or less.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

As used herein, the term "on the order of", when used in conjunction with a quantity or parameter, refers to a range spanning approximately one tenth to ten times the stated quantity or parameter.

Unless defined otherwise, all technical and scientific terms used herein are intended to have the same meaning as commonly understood to one of ordinary skill in the art. Unless otherwise indicated, such as through context, as used herein, the following terms are intended to have the following meanings:

As used herein, the phrase "silicon nitride" may refer to stoichiometric silicon nitride ($Si_3N_4$), to non-stoichiometric silicon nitride (i.e. $Si_xN_y$) and to silicon oxynitride ($Si_xO_yN_z$) with refractive indices typically in the range 1.45-2.0.

As used herein, the phrase "tellurium oxide" refers to stoichiometric tellurium oxide ($TeO_2$) and other tellurium-based compositions, such as tellurium dioxide doped with other elements to form multicomponent tellurite glass. A tellurium oxide layer may include one or more dopants, such as, but not limited to, rare earth dopants.

As used herein, the phrase "visible" corresponds to a wavelength range spanning 0.4 to 0.7 μm.

As used herein, the phrase "near-infrared" corresponds to a wavelength range spanning 0.7 to 2.0 μm.

As used herein, the phrase "mid-infrared" corresponds to a wavelength range spanning 2.0 to 8.0 μm.

As used herein, the phrase "infrared" refers to the near-infrared and mid-infrared spectral ranges.

Silicon nitride has emerged as a platform of choice for low-loss, compact and high performance photonic integrated circuits for a wide variety of applications. Silicon nitride waveguides have high refractive index contrast, enabling compact waveguide bends, low losses throughout the visible and infrared, nanoscale patterning through mature processing techniques and allow for volume chip production through standard wafer-scale fabrication steps.

Recently, additional functionality has been added to silicon nitride waveguide platforms through post-processing. For example, active devices capable of amplification (gain) have been developed using silicon nitride waveguides. For example, U.S. Pat. No. 9,325,140 describes devices formed by burying (recessing) a silicon nitride waveguide within a silicon dioxide layer and subsequently depositing a planar aluminum oxide cladding layer. Due to the significant refractive index difference between the planar aluminum oxide layer (~1.6) and the silicon nitride waveguide (~2.0), a propagating mode can be anchored by the underlying silicon nitride waveguide, permitting localization and confinement of a propagating mode. If the size of the silicon nitride layer is made sufficiently small and the planar aluminum oxide layer is deposited in sufficiently close proximity to the underlying silicon nitride waveguide, then a portion of the mode can be made to reside within the planar aluminum oxide layer. This device configuration permits the formatting of active amplifying devices by doping the overlying planar aluminum oxide layer.

Unfortunately, this device configuration suffers from several drawbacks that can limit is applicability, especially in applications such as integrated optics. One significant drawback of this device configuration is that it can be challenging to achieve small effective mode areas (e.g. as defined by 1/e of the electric field) due to the lower refractive index of the aluminum oxide layer. This lower refractive index can require a layer of aluminum oxide that exceeds 1 μm, leading to effective mode areas well above 2 μm$^2$.

Another significant drawback of designs that employ a planar aluminum oxide layer is the weak lateral confinement. Such a design relies entirely on the buried silicon nitride waveguide to provide lateral confinement, without any confinement provided by the planar aluminum oxide layer due to its planar symmetry. The consequence of this weak confinement is that guided modes require a very large minimum bend radius, which can make such a design impractical for integrated optics applications that require or rely on tight submillimeter waveguide bends. In order to overcome this problem, alternative complex designs are provided in U.S. Pat. No. 9,325,140 that require the deposition of a layer of aluminum oxide within a trench in the silicon oxide layer, relying on the refractive index contrast between the aluminum oxide layer and the lateral silicon oxide side walls of the trench to achieve an improved minimum bend radius, thereby leading to a complex device that still suffers from large effective mode areas.

The present inventors, searching for a solution to the aforementioned problems associated with the preceding design involving a planar aluminum oxide layer formed over a buried silicon nitride layer, explored alternative device configurations that would be capable of achieving a more compact mode area, lower minimum bend radius, and a simpler design, while still being capable of supporting amplification through doping.

The inventors initially considered the possibility of fabricating strip waveguides using tellurium oxide. Tellurium oxide has a number of optical properties that are attractive for use in optical waveguide devices, especially for integrated photonics. For example, pure tellurium oxide ($TeO_2$) has high thermal and chemical stability, low optical attenuation from visible to mid-infrared wavelengths (spanning a wavelength range of 0.4 to 5 µm), a high refractive index (e.g. n=2.1 measured at a wavelength of 1550 nm) and low dispersion. Its high refractive index enables high core-cladding refractive index contrast and small waveguide bends, thus facilitating compact integrated devices. Further, the high core refractive index allows for small waveguide cross-sections and mode areas, which can be important for obtaining high optical intensities and efficient all-optical devices.

Tellurium oxide also has the one of the highest nonlinearities of all oxide glasses (e.g. a nonlinear refractive index of approximately $1.3 \cdot 10^{-18}$ $m^2/W$; measured at a wavelength of 1.9 µm), a large Raman gain coefficient (e.g. approximately $2 \cdot 10^{-12}$ m/W measured at a wavelength of 1550 nm), and a high acousto-optic figure of merit, with values approximately 50, 20 and 15 times those of silica, respectively. Furthermore, the unique site variability in the tellurium oxide glass matrix enables high rare earth dopant solubility and leads to large emission bandwidths, motivating its application in integrated optical amplifiers and lasers. Its low maximum phonon energy (~700-800 $cm^{-1}$) means that non-radiative transitions are less favourable and amplifier and laser operation can be extended to bands in the visible, near and mid-infrared that are typically only accessed by fluoride host materials.

Despite these potential benefits of employing tellurium oxide as a material for forming optical waveguides, previous attempts to fabricate tellurium-oxide-based waveguides have failed to achieve the desired combination of low loss and high confinement (low effective mode area). Indeed, previous work in fabricating tellurium oxide thin film waveguides, particularly the work by Pietralunga [S. M. Pietralunga, M. Lanata, M. Ferè, D. Piccinin, G. Cusmai, M. Torregiani, and M. Martinelli, "High-contrast waveguides in sputtered pure TeO2 glass thin films," Opt. Express 16(26), 21662-21670 (2008).] and Madden [S. J. Madden and K. T. Vu, "Very low loss reactively ion etched Tellurium Dioxide planar rib waveguides for linear and non-linear optics," Opt. Express 17(20), 17645-17651 (2009).] used tellurium oxide rib waveguide structures, patterning waveguides by etching directly into the tellurium oxide layer. Such approaches were hindered by several technical problems, which are described in further detail below.

Indeed, since tellurium oxide is soluble in most basic and acidic solutions, including photoresist developers, the ability to form waveguides from deposited layers is limited. Therefore, when patterning waveguides, a protective layer (silicon dioxide [S. M. Pietralunga, M. Lanata, M. Ferè, D. Piccinin, G. Cusmai, M. Torregiani, and M. Martinelli, "High-contrast waveguides in sputtered pure TeO2 glass thin films," Opt. Express 16(26), 21662-21670 (2008).], or a spin-on polymer [S. J. Madden and K. T. Vu, "Very low loss reactively ion etched Tellurium Dioxide planar rib waveguides for linear and non-linear optics," Opt. Express 17(20), 17645-17651 (2009).]) must be deposited onto the tellurium oxide layer to prevent it from dissolving during the photolithography process.

Secondly, there are few good options for etching tellurium oxide. Because of the high solubility of tellurium oxide, wet etching occurs rapidly and is too difficult to control. Investigations of fluoride based chemical plasma etching by Vu resulted in large amounts of sidewall roughness resulting of formation of the $TeF_4$ compound redepositing onto the film during etching [K. T. Vu and S. J. Madden, "Reactive ion etching of tellurite and chalcogenide waveguides using hydrogen, methand, and argon," J. Vac. Sci. Technol. A 29(1), 011023 (2011).]. The work of Pietralunga used a purely physical argon plasma etching chemistry, where etching roughness was not detailed, however, waveguides with only a shallow ~80 nm etch into the tellurium oxide layer showed large background waveguide propagation loss of 5.7 dB/cm.

The work of Madden used a hydrogen-based etch chemistry with improved results, producing smooth waveguide sidewalls. A 4 µm wide multimode waveguide was able to demonstrate <0.1 dB/cm background waveguide propagation loss at a wavelength of 1290 nm. However, the etch chemistry used to etch tellurium oxide films was found to create large sidewall roughness when used in erbium doped tellurium oxide:Er3+ films. For erbium doped waveguides, a second undoped tellurium oxide layer was deposited onto the erbium doped layer to be used for patterning and etching. Thinner 2 µm wide single mode erbium doped waveguides were estimated to have 0.6 dB/cm of background propagation loss, after accounting for the absorption loss introduced by the erbium dopants.

As prior attempts at fabricating tellurium waveguides faced the numerous challenges described above, the present inventors considered whether or not a hybrid device configuration could be employed based on a tellurium oxide layer formed over a silicon nitride waveguide. The present inventors realized that due to the larger refractive index of tellurium oxide and the similarity between the refractive indices of tellurium oxide (~2.1 in the near infrared) and silicon nitride (~2.0 in the near infrared), the device configuration would not be limited to the "buried configuration" that was necessary in the previous device configuration involving a planar layer of aluminum oxide deposited on silicon oxide over a buried silicon nitride waveguide.

In particular, the present inventors realized that the large refractive index of tellurium oxide and its similarity to the refractive index of silicon nitride permits a hybrid waveguide that is significantly different and much simpler to fabricate than the aforementioned buried configuration (involving the planar aluminum oxide layer). The inventors understood that instead of burying the silicon nitride waveguide, an unburied (or partially buried) silicon nitride waveguide could be overcoated (directly, or indirectly, as described further below) with a conformal layer of tellurium oxide. Such a conformal coating layer—i.e. a thin film of tellurium oxide having cross-sectional features inherited from the underlying interface of the silicon nitride waveguide—would result in the deposition of a coating of tellurium oxide that extends laterally (e.g. in a planar configuration) on either side of the silicon nitride waveguide, but due to its conformal nature, forms a conformal raised region (a protuberance) over the silicon nitride waveguide. As a result, both the underlying silicon nitride waveguide and the tellurium oxide coating exhibit spatial structural features (raised sections and corners) that define a waveguide and aid in the lateral confinement of an optical mode, with the ability to confine the majority of the optical mode within the tellurium oxide layer. In effect, such a structure utilizes the underlying silicon nitride waveguide—which can be efficiently processed using conventional methods to achieve low loss and smooth side walls—as a template for forming a coating layer of tellurium oxide that itself has features that assist in mode confinement. As explained below, the use of a silicon nitride waveguide to form structural features in an overlying layer of tellurium oxide is particularly attractive because silicon nitride waveguides are low loss compared to other volume production platforms such as silicon-on-insulator and enable small features and bending radius.

Accordingly, various aspects of the present disclosure provide example hybrid waveguide platforms based on tellurium oxide conformally coated silicon nitride waveguides in which the advantages of the two integrated optical materials are combined and exploited. The present example embodiments may be advantageously employed to utilize the wafer-scale, high-resolution technology available with silicon nitride, while potentially brining new and enhanced linear and nonlinear functionalities to silicon nitride photonic circuits via the overlying tellurium oxide layer. Various example embodiments achieve small mode area waveguides—e.g. with effective single mode areas below 2 $\mu m^2$, or even below 1 $\mu m^2$—yielding devices that are feasible of generating high optical intensities that can be employed for all-optical devices. Moreover, the present example hybrid waveguides can be exhibit, via patterning of the underlying silicon nitride waveguide, small feature sizes suitable for the fabrication of resonant and active devices such as cavities and lasers, while potentially avoiding the high losses due to sidewall scattering in high-refractive-index-contrast materials that have plagued prior attempts.

The present example hybrid waveguide can advantageously leverage many potentially beneficial aspects of tellurium oxide. In addition to the aforementioned benefits, tellurium oxide films can be deposited at low temperature, which is ideal for post-processing onto a variety of photonic platforms. Post-processing of tellurium oxide onto existing waveguide platforms could alleviate challenges with the material—particularly with developing standard wafer-scale and high-resolution etch recipes for the doped films and leverage the cost-effective production methods and standard photonic integrated circuit architectures on those platforms. Meanwhile, silicon nitride is widely used to provide low loss waveguiding in passive, or active silicon photonic platforms. Silicon nitride is CMOS compatible, enabling integration using standard silicon foundries, which in turn enables high resolution and wafer-scale processing for maximum flexibility in device design and low-cost mass production, respectively. Combining the material advantages of tellurium oxide (optionally doped) and silicon nitride waveguide technology can enable mass produced, ultra-compact amplifiers and lasers for emerging data communications and microphotonic systems. Using silicon nitride as a structural and geometric basis for the formation of a conformal tellurium oxide waveguide layer enables integration into monolithic silicon photonic chips (many system functions on one chip) and/or compact and robust stand-alone amplifier/laser devices on a chip that will be built into compact modular systems such as transceivers. Furthermore, as described below, utilizing mature high-resolution fabrication methods associated with silicon nitride processing could enable smaller tellurium oxide waveguide geometries, leading to more compact devices and smaller effective mode areas, higher intensities and more highly efficient all-optical processes.

Figure 1A:
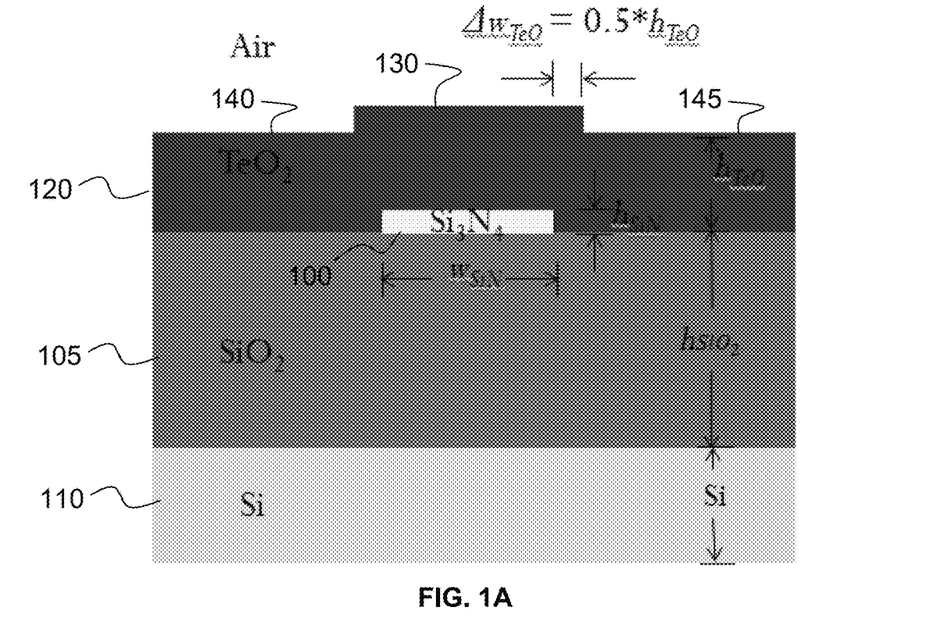
FIGS. 1A and 1B show cross sections an example device structures, annotated with non-limiting example device size dimensions.
Figure 1B:
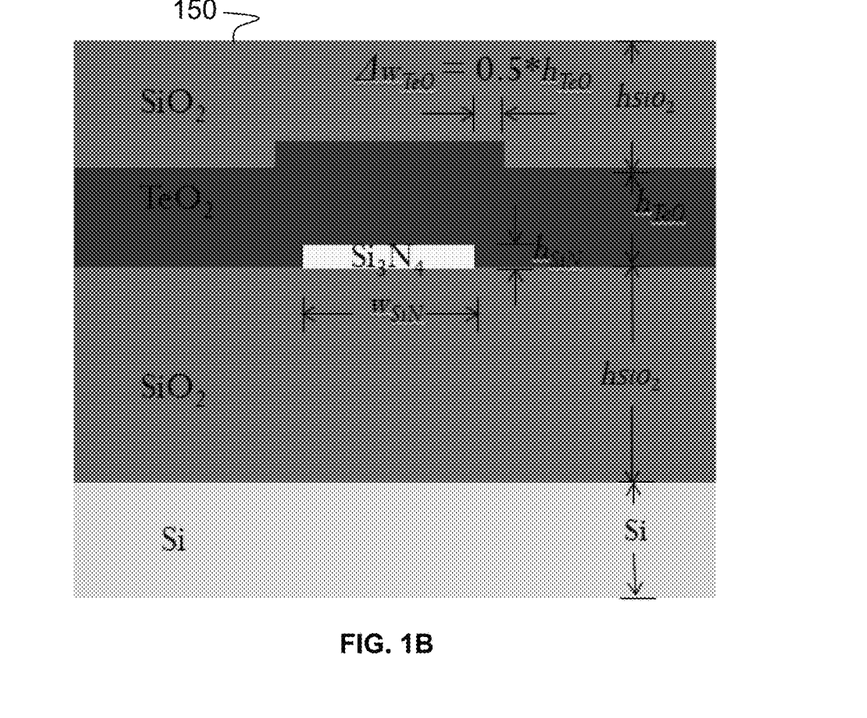

Non-limiting example embodiments of such a hybrid waveguide are illustrated in FIGS. 1A and 1B, which show cross-sectional views. As can be seen in the figure, a silicon nitride waveguide 100 is formed on dielectric layer 105 (e.g. silicon oxide; $SiO_2$) that is supported by a substrate 110, where the dielectric layer 105 has a refractive index lower than silicon nitride. A tellurium oxide layer 120 is deposited over the silicon nitride waveguide 100 such that the tellurium oxide layer 120 forms a conformal layer that inherits (at least partially) the underlying shape of the silicon nitride waveguide 100, thereby forming a conformal raised region (a protuberance) 130 above the silicon nitride waveguide 100, while also forming planar regions 140 and 145 that extend laterally from the silicon nitride waveguide 100. As shown in the examples below, the present example structure enables the formation of a guided single mode that extends from the raised region of the tellurium oxide layer that resides above the silicon nitride waveguide into the silicon nitride waveguide, and the dimensions of the structure may be selected such that a majority of the optical mode is confined within the tellurium oxide layer, at least over a portion of the infrared region.

FIG. 1A illustrates an example implementation in which the tellurium oxide layer 120 forms an upper layer of the device. In some example embodiments, an additional cladding layer may be provided on the tellurium oxide layer 120, such as, for example, a silicon oxide (e.g. $SiO_2$) layer 150 as shown in FIG. 1B. Other non-limiting examples of a suitable outer cladding layer include polymer (e.g. fluoropolymer), spin-on glass, Cytop, or other lower index glass cladding ($<TeO_2$), and/or a higher index thin layer for dispersion engineering.

The example structures shown in FIGS. 1A and 1B enables high refractive index contrast between core and cladding, low optical losses using silicon nitride waveguide technology, and, in cases in which the tellurium oxide layer is doped to form a gain medium, high optical gain via control of the propagating optical mode profile such that a high proportion of light propagates in the doped tellurium oxide gain material. The use of high refractive index core materials (silicon nitride and tellurium oxide) and lower refractive index cladding material (e.g. silicon dioxide and air) enables a small minimum waveguide bend radius, thus enabling highly compact amplifying or laser waveguide structures such as spirals. Other example advantages/applications of the present example hybrid tellurium-oxide-coated silicon nitride waveguides, relative to conventional silicon nitride and/or silicon waveguides, include: high nonlinearity suitable for nonlinear optical devices, high Raman gain (e.g. for Raman amplifiers and lasers), high acousto-optic figure of merit for acousto-optic devices (e.g. acousto-optic switches), and the potential to dope with a wide range of elements (including, but not limited to, rare earths) to form tellurite glasses or rare-earth-doped tellurite glasses, thereby permitting the tailoring of glass properties for a wide range of potential applications.

Although the many of the example embodiments described in the present disclosure illustrate hybrid waveguides using a strip waveguide formed in silicon nitride, it will be understood that a wide range of waveguide geometries may be employed in the alternative. For example, the waveguide geometry employed to form the silicon nitride waveguide may be rib waveguide. A rib waveguide geometry may be employed, for example, in order to employ a thin silicon nitride slab beside the main silicon nitride ridge as an etch stop (e.g. if the chip has metals, etc. and it is necessary or desirable to etch through the top cladding to make a trench to access the silicon nitride waveguide layer). In other example implementations, the waveguide may have a cross-sectional geometry other than a strip or rib.

It will be understood that the phrase "waveguide" may refer to any elongate segment that is capable of guiding one or more modes. A waveguide may be passive, active, or a combination thereof, and may include additional features, such as patterns for coupling and/or feedback, and may be doped. For example, a waveguide may form a portion or segment of a device such as a laser, amplifier, linear resonant cavity, ring resonator, acousto-optical switch, waveguide coupler, and/or other features and devices.

The silicon nitride waveguide 100 may reside entirely above the dielectric layer 105, or may alternative be partially recessed within the dielectric layer 105, such that at least a portion of the silicon nitride waveguide 100 protrudes above the surface of the dielectric layer 105 in order to confer and create a related protrusion in the tellurium oxide layer 130 that is deposited above. Although many of the present example embodiments refer to a single silicon nitride waveguide underlying the tellurium oxide layer, this may be achieved, in some example embodiments, by providing multiple elongate segments of silicon nitride in close proximity, such that the multiple elongate segments of silicon nitride, together with the overlying layer of tellurium oxide, are capable of guiding an optical mode. Furthermore, although some example embodiments described herein employ a single conformal tellurium oxide layer, it will be understood that a hybrid waveguide may be formed using multiple tellurium oxide layers.

The skilled artisan will understand that the specific processing parameters, chemical compositions, and device dimensions described herein are intended to be non-limiting, and that these parameters, compositions and dimensions can vary depending on the desired properties and functionality of a device or design. For example, the example criterion $\Delta w_{TeO}=0.5*h_{TeO}$ shown in FIGS. 1A and 1B was employed merely for simulations and thus only applies to a specific example implementation, and is not intended as generic design rule and.

Figure 1C:
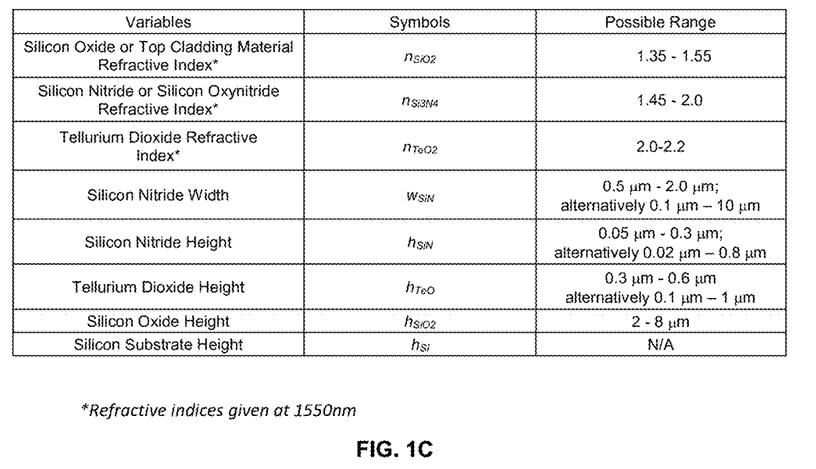
FIG. 1C is a table illustrating non-limiting example ranges for parameters of a tellurium-oxide-coated silicon nitride waveguide.

FIG. 1C lists a non-limiting set of example parameter and dimension ranges for example configurations of a tellurium-oxide-coated silicon nitride waveguide. The values provided in this figure are merely examples of suitable ranges, and other devices and designs may employ parameters and dimensions that extend beyond the illustrated ranges.

As can be seen in the example parameters shown in FIG. 1C, the example hybrid waveguides described herein may provide a high degree of confinement of optical modes guided therein, as a consequence of the high refractive index contrast of both the tellurium oxide layer and the underlying silicon nitride waveguide. In some non-limiting example embodiments, the tellurium oxide layer may be formed with a thickness ranging from 0.3 µm to 0.6 µm or from 0.1 µm to 1 µm. In some non-limiting example embodiments, the silicon nitride waveguide may be formed with a height ranging from 0.05 µm to 0.3 µm or, for example, from 0.02 µm to 0.8 µm. In some non-limiting example embodiments, the silicon nitride waveguide may be formed with a width ranging from 0.5 µm to 2 µm or, for example, from 0.1 µm to 10 µm. In some example embodiments, the dimensions of the silicon nitride waveguide and the tellurium oxide layer may be selected such that at least 50%, at least 60%, at least 70%, at least 80% or at least 90% of a guided single mode within at least a portion of the visible and/or near-infrared is confined within the tellurium oxide layer. In some example embodiments, the dimensions of the silicon nitride waveguide and the tellurium oxide layer may be selected such that the effective mode area, based on the 1/e level of the electric field, is between 0.4 and 2.5 $\mu m^2$ or, for example, between 0.4 and 10.0 $\mu m^2$ within at least a portion of the visible and/or near-infrared. In some example embodiments, the dimensions of the silicon nitride waveguide and the tellurium oxide layer may be selected such that the minimum bend radius of the composite waveguide is less than 1 mm or, for example, 1 cm, within at least a portion of the visible and/or near infrared.

It will be understood that the device configurations shown in FIGS. 1A and 1B are merely intended to illustrate non-limiting example embodiments, and that the illustrated configurations can be modified without departing from the intended scope of the present disclosure. For example, while FIGS. 1A and 1B show device features with sharp orthogonal corners, fabricated devices may have rounded corners, and the shape (profile) of the top surface of the conformal tellurium oxide layer 120 need not exactly match the shape (profile) of the underlying silicon nitride waveguide.

While FIGS. 1A and 1B illustrate example embodiments in which the tellurium oxide layer 120 directly contacts the underlying silicon nitride waveguide 100, in other example embodiments, one or more intermediate conformal layers (which may have a refractive index less than that of tellurium oxide) may be disposed between the silicon nitride waveguide 100 and the tellurium oxide layer 120. For example, a conformal silicon oxide layer may be formed over the silicon nitride waveguide 100 and under the tellurium oxide layer 120 such that the silicon nitride waveguide 100 and the tellurium oxide layer 120 mutually support a common optical mode.

In some example implementations, the substrate 110 may be silicon. In other example implementations, the substrate may be formed from other example materials, such as, but not limited to, glass, quartz, sapphire, and germanium. In some example implementations, the dielectric layer may be formed from silicon oxide (e.g. $SiO_2$). In other example implementations, the dielectric may be formed from other example materials, such as, but not limited to, multicomponent glass, quartz, or sapphire.

The tellurium oxide layer may be undoped, or at least a portion of the tellurium oxide layer may be doped with one or more dopants. Example dopants include, but are not limited to, rare earth dopants such as, but not limited to, Er, Tm, and Pr. Other dopants, such as bismuth, silicon, or germanium may be employed in the alternative or in addition.

The present example device configuration can be sharply contrasted with that of the aforementioned buried configuration that employed a planar aluminum oxide layer. As described above, the planar aluminum oxide layer of the aforementioned buried configuration fails to exhibit any spatial structure that assists in lateral confinement of an optical mode, and this confinement is provided exclusively by the silicon nitride waveguide. In stark contrast, in the present example conformally-coated embodiment, both the underlying silicon nitride waveguide and the tellurium oxide coating exhibit spatial structural features that aid in the confining of an optical mode. Moreover, since both the tellurium oxide layer and the underlying silicon nitride waveguide exhibit high (~2) refractive indices, the waveguide effective mode area can be significantly reduced while maintaining a small (submillimeter) bend radius.

Figure 1D:
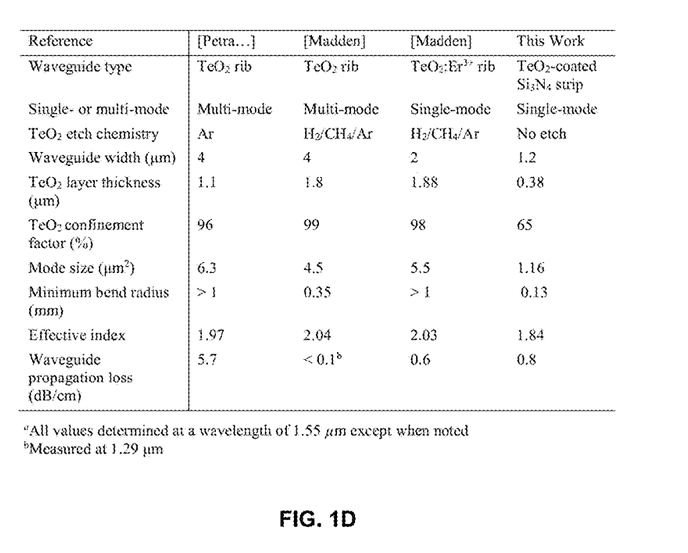
FIG. 1D compares the properties of known tellurium oxide waveguides with the properties of an example hybrid tellurium-oxide-coated silicon nitride waveguide.

As explained in detail in the examples provided below, example hybrid waveguides fabricated according to the example methods provided herein have been found to exhibit single mode propagation with a low 0.8 dB/cm background propagation loss. FIG. 1D summarizes and compares the relevant parameters of the previous tellurium oxide thin film waveguide work, to the example hybrid waveguides fabricated according to the methods disclosed herein. The table highlights the advantages of tellurium oxide coated silicon nitride waveguides with regard to smaller mode size, and small minimum bending radius, allowing for the design of compact and high efficiency tellurite glass devices, with the clear trade off being the reduced optical intensity in the tellurium oxide film.

It will be understood that the example embodiments described herein may be employed in a wide range of optical devices. For example, as described below, the silicon nitride waveguide underlying the tellurium oxide layer may consist of multiple strips and may include resonant structures such as microring resonators, Bragg reflection gratings, or distributed feedback cavities to form a laser cavity.

Figure 2A:
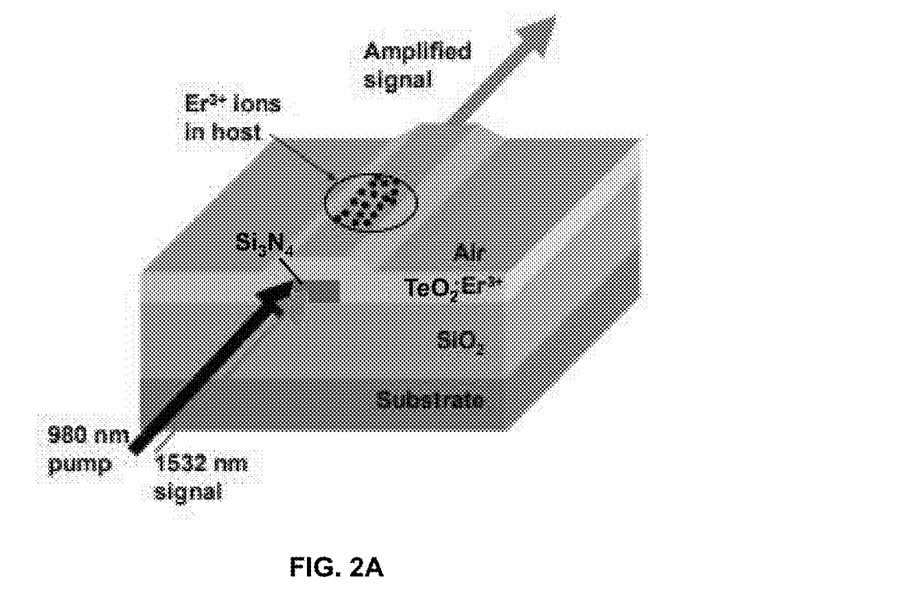
FIGS. 2A and 2B illustrate example devices employing a silicon nitride waveguide coated with a tellurium oxide layer, showing (A) an example amplifier and (B) and example laser.

For example, as shown in FIG. 2A, the tellurium oxide layer of a hybrid optical waveguide may be doped to facilitate gain when pumped (e.g. via a suitable co-propagating optical pump beam). Suitable dopants for the tellurium dioxide conformal coating layer include rare-earth dopants, such as Er, Tm, and Pr, and other types of other dopants, as noted above. Such doped waveguides have the potential to provide high gain from a very compact device, which is advantageous for communications applications and/or integrated photonic microsystems. For rare earth doped waveguide amplifiers (REDWAs), tellurium oxide offers a number of advantages over other materials because of its larger emission cross sections, higher refractive index thus more compact devices, large emission bandwidth, low ion-to-ion cross relaxation and quenching, and low optical loss throughout visible and infrared wavelengths. Also, high rare earth solubility and high optical gain have been demonstrated in tellurium oxide thin films and waveguides. Because of its low phonon energies, thus longer luminescence lifetimes for some electronic transitions, tellurium oxide also may enable efficient lasing and amplification at wavelengths not available with other conventional rare-earth-doped oxides (e.g. 1.3 um using Pr, 1.4 um and 2.0 um using Tm).

Figure 2B:
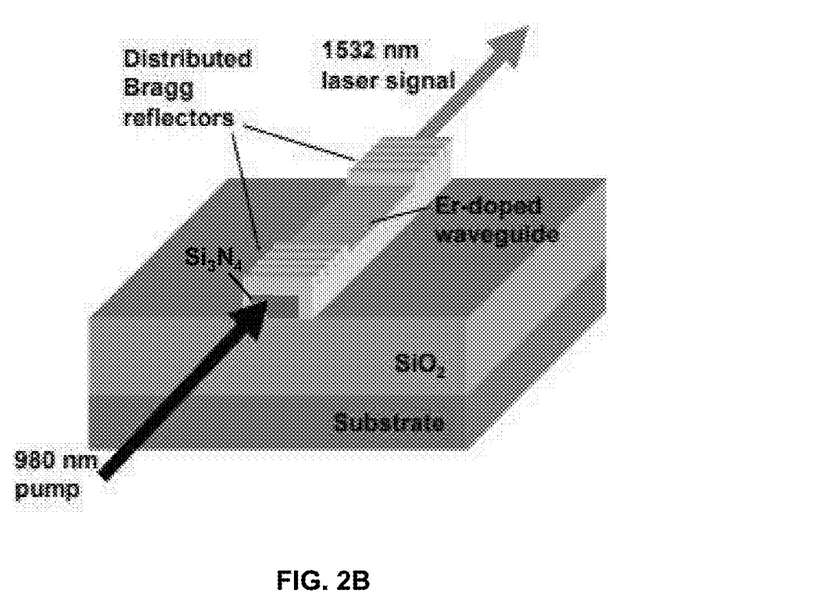

Another example device that can be fabricated using a hybrid tellurium-oxide-coated silicon nitride waveguide is a distributed feedback laser, as illustrated in FIG. 2B. The figure demonstrates a 3D isometric interpretation of the proposed device architecture with emphasis on a potential resonator structure patterned into the waveguide core and gain material. It will be understood that the present example embodiment is not intended to be limited to the resonator structure shown and that other possible patterned structures may be formed in the alternative.

Additional photonic devices that may incorporate a silicon nitride coated with a layer of tellurium oxide may include a wide range of active and passive devices, and combinations thereof. Non-limiting examples of passive devices include directional couplers, ring resonators, and multimode interferometers, among others, which may be fabricated reliably using standardized wafer scale silicon nitride waveguide processing technology. Such passive devices such as these can be used to design more advanced tellurite waveguide components, such as resonant cavities for non-linear frequency comb generators or rare earth lasers. Examples of active devices include amplifiers, lasers, nonlinear optical devices (e.g. devices capable of initiating nonlinear optical processes such as four-wave-mixing), acousto-optical devices such as acousto-optical filters and switches, frequency comb/multi-wavelengths sources for metrology, communications, precision clocks etc., and Raman amplifiers and lasers. Silicon nitride waveguides are also integrable directly with silicon waveguides, which has established integration of active optoelectronic components, including modulators and photodetectors. With technology such as this tellurite waveguide devices could be integrated into larger silicon photonic systems, using an end of line tellurium oxide film deposition.

Because it is a CMOS compatible material, silicon nitride waveguides and devices can be included in 3D-integrated active silicon photonics platforms. Silicon photonics requires an efficient monolithic laser source for photonic signal generation. In some example implementations, the hybrid tellurium-oxide-coated silicon nitride waveguides described herein may be employed to provide optical power sources for technology including but not limited to, optical computers, data centers, and digital information routing as a whole.

The broad range of wavelengths available by incorporating different and/or combinations of dopants in the tellurium oxide layer, and the capability of forming various active and passive device may also find applications beyond the communications field. For example, various example embodiments disclosed herein may be employed and adapted for applications involving quantum microsystems, monolithic and hybrid on-chip lasers, sensing and spectroscopic circuits, and may find application in additional fields such as metrology and medical diagnostics.

Figure 3:
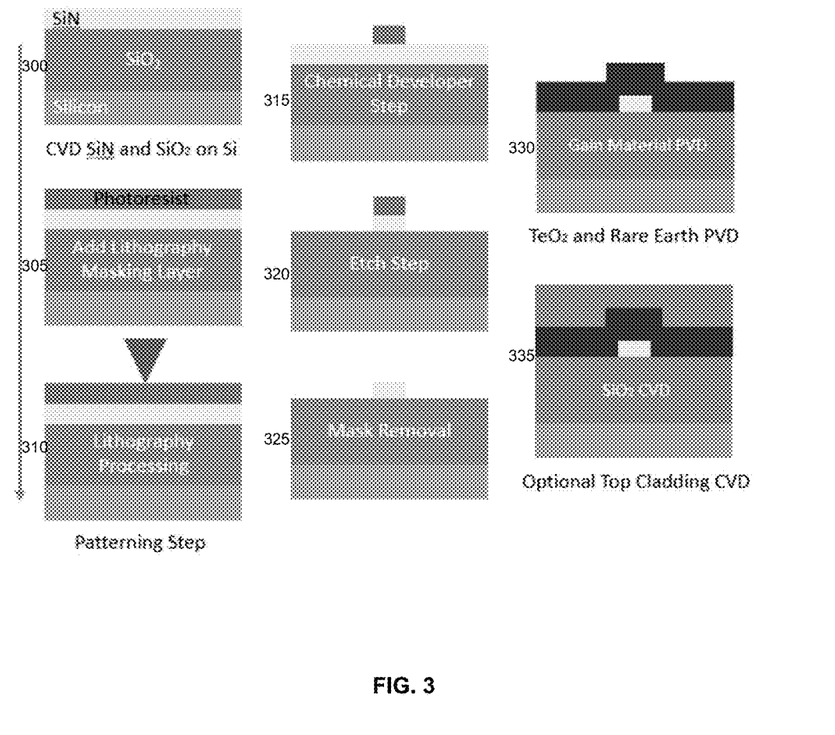
FIG. 3 schematically illustrates an example fabrication process for fabricating a hybrid waveguide based on a silicon nitride ridge waveguide coated with a layer of tellurium oxide.

FIG. 3 demonstrates an example method of fabricating a tellurium oxide coated silicon nitride optical waveguide structure. In step 300, chemical vapor deposition (CVD) is employed to deposit silicon nitride as a thin film. Potential CVD methods include plasma-enhanced CVD (PECVD) and low pressure CVD (LPCVD). In step 305 a photo resist or other masking layer such as a metal is applied on top of the silicon nitride film. In step 310, the photoresist mask layer is patterned using a lithography technique such as immersion lithography, stepper lithography or electron beam lithography. In step 315 the mask layer pattern is formed by selectively removing regions of the photoresist mask using developer solution. In step 320 the silicon nitride layer is etched using wet chemical etching or reactive ion etching. In setup 325 the photoresist mask layer is removed in chemical solvent or oxygen plasma. In step 330, physical vapor deposition (PVD) is employed to deposit a conformal layer (a thin film having cross-sectional features inherited from the underlying interface of the silicon nitride waveguide) of tellurium oxide over the silicon nitride waveguide. The PVD process employed could be sputtering, reactive sputtering, or reactive co-sputtering. In step 335 a silicon oxide or other top-cladding layer is deposited on the chip using PECVD, or coated on the chip using spin-coating.

The tellurium oxide layer may be directly deposited on the underlying silicon nitride waveguide, such that the tellurium oxide layer directly contacts (at least a portion of) the underlying silicon nitride waveguide as shown in the example method illustrated in FIG. 3. However, it will be understood that the example method shown in FIG. 3 merely illustrates one possible method of fabricating a tellurium-oxide-coated silicon nitride waveguide and that the illustrated process may be varied without departing from the intended scope of the present disclosure. For example, in one alternative example implementation, the tellurium oxide layer may be indirectly deposited on the underlying silicon nitride waveguide, such that one or more intermediate dielectric layers (such as a silicon dioxide layer) resides between the tellurium oxide layer and the underlying silicon nitride waveguide. The intermediate layer may be sufficiently thin such that a fundamental mode resides predominantly within the tellurium oxide layer above the silicon nitride waveguide.

In some example implementations, the silicon nitride layer is patterned by masked lithography techniques (contact lithography, stepper lithography, immersion lithography) or direct-write methods (e-beam lithography or UV laser resist mask patterning). For example, patterning may be employed to add additional features, such as those suitable for achieving resonator structures. It will be understood that steps such as patterning and doping can vary from structure to structure depending on the feature sizes and performance required. Patterning steps can pertain to, but are not limited to the following example methods: electron-beam lithography, masked optical lithography and other nano-patterning techniques.

Although many of the preceding example embodiments have employed tellurium oxide as a coating layer for conformally coating a silicon nitride waveguide, it will be understood that in other example embodiments, an alternative high-index metal oxide material may be employed. Non-limiting examples of suitable alternative oxide materials include oxides such as bismuth oxide, titanium dioxide, and tantalum pentoxide (with refractive indices typically between 2-2.4). In other example embodiments, the conformal coating layer may be formed from aluminum oxide or germanium oxide.

EXAMPLES

The following examples are presented to enable those skilled in the art to understand and to practice embodiments of the present disclosure. They should not be considered as a limitation on the scope of the disclosure, but merely as being illustrative and representative thereof.

Example 1: Tellurium Oxide Thin Film Deposition

The present example describes an example and non-limiting method that was employed to achieve the deposition of a low-loss tellurium oxide layer. According to the example method, a tellurium oxide coating layer is deposited in a radio frequency (RF) reactive sputtering process, in which a 3-inch metallic tellurium target is sputtered in an argon/oxygen ambient, resulting in the deposition of tellurium oxide.

For the fabrication of optically efficient devices, it can be important that the deposited film has low optical propagation loss over the relevant operational spectral region. Previous work has indicated that stoichiometry can play a significant role in loss optimization, with stoichiometric 2:1 oxygen to tellurium ratio ($TeO_2$) films having the lowest optical losses. Metal rich films can result in a significant increase in optical loss due to the absorption from the excess metal atoms, while oxygen rich films will experience a slow increase in optical loss.

According to the present example method, depositions were performed on 6 inch thermally oxidized silicon with a glass witness slide mounted to the sample holder by carbon tape. Argon flow was set to a constant 12 sccm for all depositions. RF sputtering power and oxygen flow rate were used to control the properties of deposited films. At a set RF power, increasing or decreasing the oxygen flow rate was used to respectively increase or decrease the oxygen content in the film where higher RF powers require a larger oxygen flow rate to achieve stoichiometry. Low-loss film depositions were found at process parameters of 150 W of sputtering power and 7.5 to 8.3 sccm of oxygen flow.

The oxygen flow necessary to achieve low loss films was found to rise slightly as the target was used. Furthermore, some hysteresis between depositions was observed, in which the oxygen flow rate required for stoichiometry was observed to shift slightly if a previous deposition was performed using an oxygen flow rate that did not achieve stoichiometry. This is believed to be the result of the target itself changing its oxidation state. However, low-loss films were generally found using the parameters stated previously. Films at these process parameters were deposited between 22 and 25 nm/min, with a refractive index of 2.08 at a 1550 nm wavelength. Film losses were observed to vary slightly between depositions, generally ranging from 0.5 dB/cm to less than the detectable limit of 0.1 dB/cm, also at a wavelength of 1550 nm.

Example 2: Tellurium-Oxide-Coated Silicon Nitride Waveguides

The present example describes a non-limiting example method for the fabrication of tellurium-oxide-coated silicon nitride waveguides using the aforementioned example method of deposition of tellurium oxide. Silicon nitride strip waveguides were fabricated on a 100-mm silicon wafer with 8-μm-thick thermal oxide layers using a standard wafer-scale foundry process.

In a first step of the example process, a 0.2-μm-thick low-pressure chemical vapor deposition (LPCVD) silicon nitride film was deposited. The silicon nitride layer thickness was chosen as a standard nitride thickness to avoid film cracking due to stress difference with the silicon substrate and achieve strong lateral confinement while still enabling high optical intensity overlap with the tellurium oxide coating layer to be deposited on top. Paperclip strip waveguides with widths of 1.2 μm, large bending radii (~1 mm) and lengths varying from 2.5 to 4.0 cm were defined in the silicon nitride layer by stepper lithography and reactive ion etching. The wafer was annealed at high temperature in $N_2$ to drive out hydrogen from the silicon nitride waveguides and reduce absorption at wavelengths around 1.5 μm due to Si—H and N—H bonds.

Figure 4A:
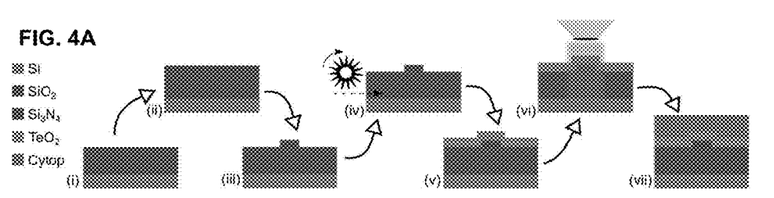
FIG. 4A illustrates an example fabrication process flow that was employed to fabricate example tellurium-oxide-coated silicon nitride waveguides.

End facets were prepared by different methods to determine optimal coupling loss, including 1) dicing the wafer directly into chips, 2) a deep trench etch followed by dicing or 3) dicing followed by focused-ion-beam (FIB) milling of the end facet in the region of the waveguide. A 0.38-μm-thick tellurium oxide coating layer was then deposited onto the individual chips. The film loss was measured to be ≤0.1 dB/cm at a wavelength of 1550 nm using the prism coupling method. A 1-μm-thick fluoropolymer top cladding was spun onto the chips (CYTOP®, n=1.39 at 1550 nm). FIG. 4A summarizes the process flow for the preparation of chips.

In step, (i) a thermal oxide layer is grown on a silicon chip by wet thermal oxidation, in step (ii) a 0.2-μm-thick layer of LPCVD silicon nitride is grown (iii) in step iii the silicon nitride layer is patterned into waveguides using stepper lithography, in step (iv) the wafer is diced into chips, in step (v) the chips are coated in a tellurium oxide layer using reactive sputtering, in step (vi) waveguide facets are smoothed in a FIB etch, in step (vii) the chips coated in a Cytop top cladding.

Figure 4B:
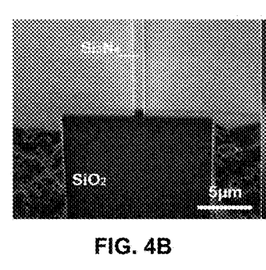
FIGS. 4B-4D show scanning electron microscopy images of different stages of the example fabrication process, where (B) and (C) show SEM images of an uncoated silicon nitride waveguide and (D) shows an image of a silicon nitride waveguide coated with a 0.3-μm-thick tellurium oxide film.
Figure 4C:
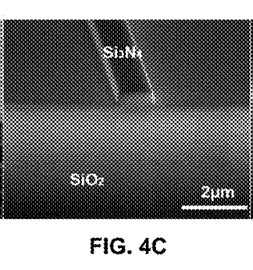
Figure 4D:
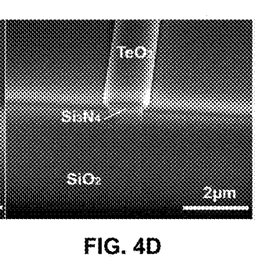

To fabricate highly smooth waveguide end facets, FIB (focused ion beam) was used to optimize coupling efficiency and loss (FIG. 4B). The FIB stage was tilted so that the beam was incident normal to the chip surface. A 30 kV beam with a current of 300 picoamps was used, ensuring that 240 seconds of milling was sufficient to remove the edge roughness completely. FIG. 4C shows an SEM image of a silicon nitride waveguide without any layer on top after final processing. The resulting composite waveguide structure is shown in FIG. 4D. A 0.3 μm thick tellurium oxide coating was used to increase optical intensity overlap with the tellurium oxide.

Figure 5A:
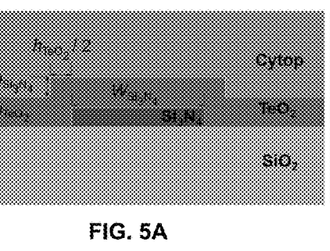
FIG. 5A is a cross-sectional illustration of an example tellurium-oxide-coated silicon nitride waveguide device configuration employed for simulations.
Figure 5B:
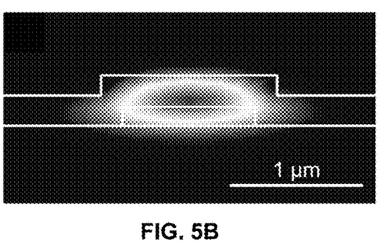
FIG. 5B shows the simulated electric field profile of the fundamental TE-polarized mode calculated for a silicon nitride strip width and height of 1.0 and 0.2 μm, respectively, and tellurium oxide film height of 0.3 μm.
Figure 5C:
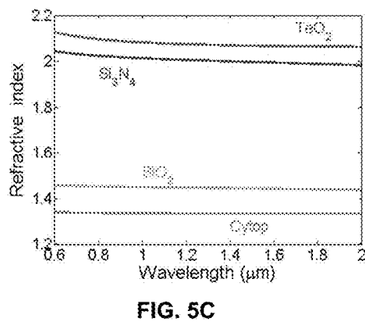
FIGS. 5C and 5D plot (C) the refractive index of materials employed to form the hybrid waveguide structure at wavelengths from 0.6 to 2.0 μm and (D) the silicon nitride single-mode waveguide maximum width, below which the waveguide will have single mode propagation, where calculations are performed at different wavelengths for a waveguide structure having a 1.2 μm wide silicon nitride waveguide strip and tellurium oxide coating thicknesses of 0.2, 0.4 and 0.6 μm.

Example 3: Calculated Tellurium-Oxide-Coated Silicon Nitride Waveguide Properties In the present example, the results of calculations of the optical properties of example tellurium-oxide-coated silicon nitride waveguides are presented. The approximated waveguide structure employed for the simulations was modeled as a conformational profile of tellurium oxide coating a silicon nitride waveguide with a rectangular cross-section, with half the tellurium oxide film deposition thickness extending over each side of the waveguide, as shown in FIG. 5A. It will be understood that the geometrical model is an approximation of a fabricated waveguide. Finite element eigenmode simulations were used to determine mode profiles, as seen in FIG. 2b, and calculate waveguide properties.

It will be understood that the silicon nitride width and layer thickness might vary in different parts of the device to optimize the performance. For example, when bending, the silicon nitride would be wide and thick. When seeking high $TeO_2$ overlap in straight waveguide sections for high gain in erbium-doped amplifiers, less-wide silicon nitride waveguides and thinner silicon nitride layers mat be desired. A possible implementation of this is a spiral structure with straight sections, where the waveguide is widened at the bend sections to reduce the bend radius and make a more compact spiral, but thinned in the straight regions to expand the mode into the erbium-doped tellurium oxide layer on top and achieve higher optical gain. At the edge of the chip, it has been demonstrated that the waveguide can be thinned laterally and vertically to achieve optimal mode dimensions for low-loss coupling to an optical fiber.

Figure 5D:
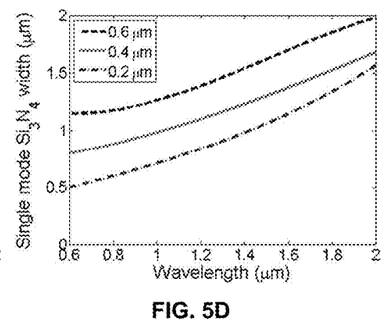

The example waveguides described in the present example were initially designed to achieve single mode waveguide conditions at a wavelength of 1.55 μm. Eigenmode simulations including higher order modes were performed to identify the single mode waveguide width. As can be seen in FIG. 5D, for the example case of tellurium oxide films having a thickness of 0.2 μm, the single mode condition is met by a silicon nitride waveguide width of 1 μm or less at a wavelength of 1.55 μm. As the film thickness increases, so does the waveguide width that is able to support a single mode, with 1.7 μm wide waveguides being single mode when deposited with a 0.7 μm thick tellurium oxide film.

Figure 6A:
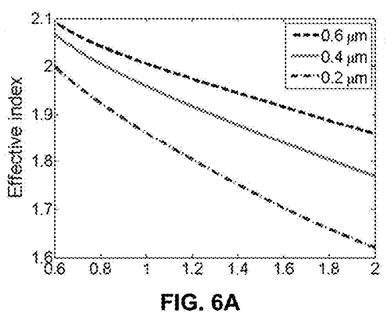

Due to the asymmetry of the waveguide structure, simulations show that first order mode is also a TE polarized mode. Therefore, a waveguide at the single mode condition will have the fundamental TE polarized mode without other TE or TM polarized modes supported. To simplify the simulation of other properties, the waveguide width was set at 1 μm, which is the maximum waveguide width that satisfies the single mode across the simulated tellurium oxide deposition thickness range of 0.25 to 0.7 μm. FIG. 6A shows the simulated effective waveguide mode index for waveguides of this width versus wavelength for different film thicknesses. For thicker films, the waveguide mode has a smaller evanescent field, and becomes more confined in the tellurium oxide coating, causing the effective index to rise.

Figure 6B:
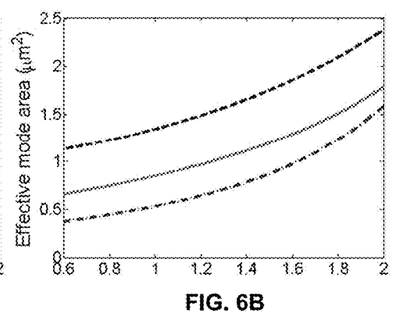
Figure 6C:
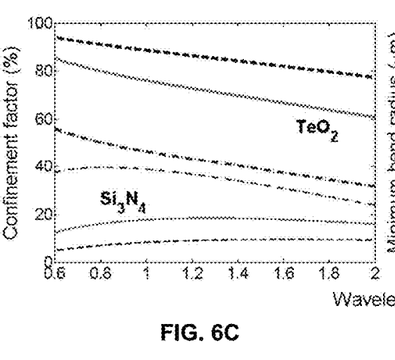

The percentage of the optical mode power simulated to be confined in the tellurium oxide coating is seen in the FIG. 6C. Results show that for a 0.3 μm thick tellurium oxide coating approximately 60% of mode power will be confined in the coating, with approximately 25% confined to the nitride layer, and the rest of the optical power in evanescent fields. Thicker tellurium oxide coatings can increase the optical confinement up to almost 90% in the coating. A large optical confinement in the tellurium oxide coating is desirable to take advantage of its material properties such as high non-linearity and rare earth solubility in the fabrication of devices. However, thicker tellurium oxide coatings in this waveguide structure have two significant drawbacks: reduced mode area and increased radiation loss from bending.

Figure 6D:
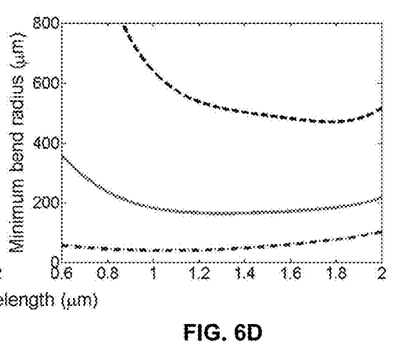

FIG. 6B plots the simulated effective mode area versus tellurium oxide film thickness. Smaller mode areas create increased optical power density, which is key towards the fabrication of efficient non-linear and rare earth amplifying devices. A waveguide with a 0.3 μm thick waveguide will have a 1.2 pmt mode area, which is ~4% of the mode area of a standard 9/125 single mode fiber (30 $um^2$). A tellurium oxide coating of 0.7 μm is shown to more than double the waveguide mode area. The other disadvantage introduced by large films is increased loss from bending radiation. FIG. 6D shows the expected bending radiation loss, simulated using an eigenmode bend solver, for a 1 μm wide waveguide with 0.3, 0.5 and 0.7 μm thick tellurium oxide coatings. Results show that a waveguide with a 0.3 μm thick coating can be bent to radii of 200 μm and below with almost no increase in bending loss, while a 0.5 μm thick coating will begin to see noticeable bending loss at approximately 400 μm radii. A waveguide with a 0.7 μm thick coating experiences a large amount of bending loss, with 0.5 dB/cm of radiation loss expected at 800 μm bends. The bending loss for waveguides with thicker coatings is improved by using larger waveguide widths closer to the single mode cutoff, however the total bending loss remains significantly worse compared to thinner coatings.

For loss measurements, 1.2 μm wide silicon nitride waveguides coated in a 0.38-μm-thick tellurium oxide layer were used. These dimensions allow for a suitable trade-off between maximizing optical confinement in the tellurium oxide layer, while maintaining a compact mode size and tight bending radii.

While the present example waveguides were designed primarily for use at wavelengths within the C-band (e.g. 1530-1565 nm, e.g. a band centered on 1.55 μm), the dominant wavelength in telecommunications, however waveguiding at other wavelengths is still of interest.

Indeed, as can be observed in the figures, the waveguide structure is simulated and characterized from 0.63 to 2 µm. FIG. 6C shows the simulated optical confinement factor in the silicon nitride waveguide and the tellurium oxide coating in red, and the waveguide mode are in blue, versus wavelength. Simulations show that at a wavelength of 0.63 µm, the mode is confined largely in the tellurium oxide ridge with a small mode size. As the wavelength increases the mode size expands, and leaks more into the silicon nitride strip, increasing confinement in the silicon nitride strip while decreasing confinement in the tellurium oxide coating. After approximately 1.1 µm, the mode begins to expand out of the waveguide mode and into the evanescent tail, decreasing confinement in both the silicon nitride strip and tellurium oxide coating.

FIG. 6D plots the simulated bending radius below which radiation loss exceeds 0.1 dB/cm. For the waveguide dimensions of the fabricated chip the minimum bending radius at 1.55 µm wavelengths is simulated to be 130 µm. When increasing the wavelength to 2.0 µm the minimum bend radius increases to 165 µm, as expected based on the weaker confinement of the mode at larger wavelengths increasing the radiation loss. However, the trend is not continued at shorter wavelengths, where at 0.63 and 0.98 µm wavelengths the simulated bend loss is seen to increase. This is believed to occur, even though the confinement is stronger at smaller wavelengths, because the contrast between the waveguide the slab mode becomes smaller at lower wavelengths, allowing the mode to more easily radiate into the slab. FIG. 6D shows the minimum bend radius at different wavelengths for a 1.2 µm wide waveguide with a 0.6, 0.4 and 0.2-µm-thick tellurium oxide coating. For the 0.6-µm-thick coating the figure shows a sharp increase in the minimum bend radius at ~1.1 µm wavelength and increases further to a >800 µm minimum radius at 0.6 µm. Thinner coatings have greater contrast between the waveguide and slab mode, which allows for lower minimum bending radii, and a less severe increase in the minimum bend radius at lower wavelengths, which can be seen in the bending radiation results for 0.4 and 0.2 µm thick films in FIG. 6D.

Example 4: Loss Measurements

Figure 7A:
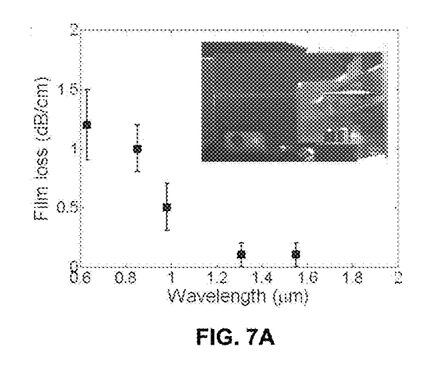
FIG. 7A plots film loss measured at wavelengths of 0.63, 0.85, 0.98, 1.31, and 1.55 μm using the prism coupling method, where the inset shows the 0.63 μm wavelength light streak measured in prism coupling.
Figure 7B:
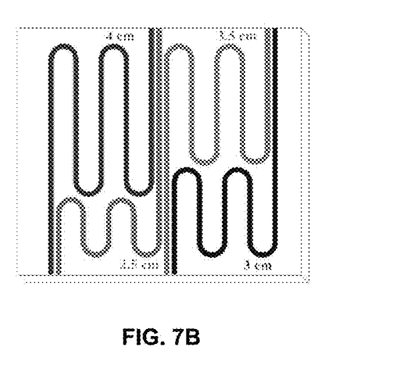
FIG. 7B schematically illustrates the paper-clip structures used to determine the waveguide propagation loss via cutback measurements.

Waveguide propagation loss is measured using the cut back method using an example test chip designed with four waveguides of different length. Different waveguide lengths were achieved on the same chip using a paperclip cutback structure. FIG. 7A shows the cutback structure design, where waveguides are routed back and forth across the chip using four 180-degree bends, where the length between bends is used to vary the total waveguide length. Waveguides with lengths of 2.5, 3, 3.5 and 4 cm are designed on a chip 1 cm across. For each waveguide length three repetitions of the waveguide are made and interlocked together using alternating bending radii at each 180-degree bend. The minimum bend radius for any waveguide is set at 600 µm, so as not to introduce noticeable bending radiation loss into the structure. Structures are measured by optically edge coupling light from a laser source onto the chip and measuring the transmitted intensity with a photodetector. The light travels through polarization controlling paddles before travelling to a lensed fiber tip, with a 2 µm spot size at a 1550 nm wavelength, mounted on an xyz stage for precise alignment of the beam with the edge facet. A lensed fiber and xyz stage is used similarly on the opposite facet to couple light off the chip and into the photodetector. FIG. 7B shows red light being edge coupled onto and travelling across a paperclip waveguide of 3.5 cm length. During measurements the polarization paddles and xyz stages are adjusted to maximize the transmitted signal intensity.

Figure 7C:
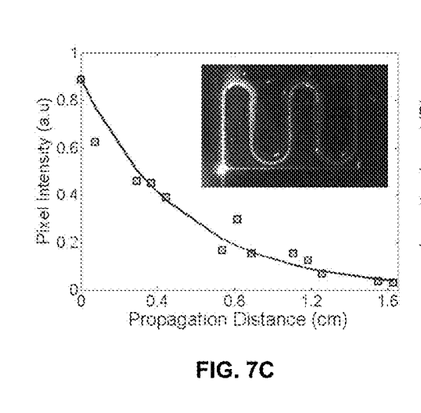
FIG. 7C plots the scattered intensity of red light versus propagation distance along waveguide, from a top view microscope image (inset), fit with an exponential relationship to measure 8.37 dB/cm of waveguide loss.
Figure 7D:
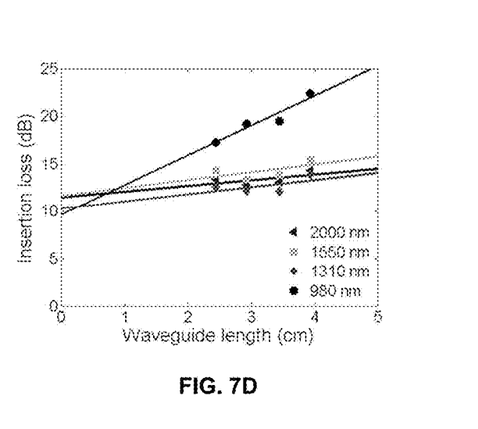
FIG. 7D plots insertion loss of waveguide with lengths from 2.5 cm to 4 cm at 980, 1310, 1550, and 2000 nm wavelengths. Linear regression fitting was used to calculate propagation losses 3.14, 0.76, 0.83, and 0.61 dB/cm, respectively

Cutback measurements were made on 1.2 µm wide silicon nitride waveguides with a 0.38-µm-thick tellurium oxide coating. Insertion loss was measured for three waveguides at each paperclip length, where the lowest loss measured among the three is taken as the loss at that specific waveguide length. Propagation loss at wavelengths of 0.98, 1.31, 1.55 and 2.00 µm was measured. FIG. 7D shows the measured total insertion loss, which is the sum of the waveguide and fiber-chip input and output coupling losses, versus waveguide length and fitted propagation loss using linear regression at each wavelength. Fits give y-intercepts ranging from 11.6 dB at 1.55 µm to 9.6 dB at 0.98 µm, suggesting approximately 5 dB of loss at each facet. Fits at 1.31, 1.55 and 2.0 µm give waveguide losses of 0.76±0.27, 0.83±0.29, and 0.60±0.21 dB/cm based on the regression analysis. At 0.98 µm the fit gives a much larger 3.13±0.26 dB/cm of propagation loss, resulting from increases to the tellurium oxide film loss, and the transition to multimode waveguiding at 0.98 µm wavelengths.

To measure the propagation loss of 0.63 µm light in the waveguide, the experimental setup was modified to employ fibers specialized for single mode red light propagation. Because of the different optical setup and large insertion losses, the propagation loss for 0.63 µm light is characterized using top down image analysis of the scattered light travelling through a waveguide. The inset of FIG. 7C shows an image of the red-light streak travelling through the waveguide. Image processing is used to determine the intensity of red light at different pixels along the length of the waveguide, which is then fit with an exponential relationship to determine a waveguide loss of 8.37 dB/cm.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. An optical device comprising:
   a substrate;
   a first dielectric layer formed on said substrate, said first dielectric layer having a refractive index less than that of silicon nitride;
   a silicon nitride waveguide formed on said first dielectric layer; and
   a tellurium oxide layer conformally disposed over said silicon nitride waveguide such that said tellurium oxide layer extends laterally in a planar configuration on either side of said silicon nitride waveguide while forming a conformal raised region over said silicon nitride waveguide, such that said tellurium oxide layer and said silicon nitride waveguide form a hybrid optical waveguide.

2. The optical device according to claim 1 wherein said tellurium oxide layer and said silicon nitride waveguide have dimensions such that over at least a portion of the near-infrared, said hybrid optical waveguide is capable of guiding a single optical mode that resides predominantly within the conformal raised region of said tellurium oxide layer.

3. The optical device according to claim 2 wherein said tellurium oxide layer has a submicron thickness.

4. The optical device according to claim 2 wherein a thickness of said tellurium oxide layer is between 0.3 and 0.6 microns.

5. The optical device according to claim 2 wherein a thickness of said silicon nitride waveguide is between 0.05 and 0.3 microns.

6. The optical device according to claim 2 wherein said tellurium oxide layer and said silicon nitride waveguide have dimensions such that said single mode has an effective mode area less than 2 square microns.

7. The optical device according to claim 2 wherein said tellurium oxide layer and said silicon nitride waveguide have dimensions such that said hybrid optical waveguide has a minimum bend radius of less than 1 mm.

8. The optical device according to claim 2 wherein said tellurium oxide layer and said silicon nitride waveguide have dimensions such that said hybrid optical waveguide has a minimum bend radius of less than 200 microns.

9. The optical device according to claim 1 wherein said silicon nitride waveguide comprise a plurality of elongate silicon nitride segments.

10. The optical device according to claim 1 wherein said silicon nitride waveguide is patterned such that said hybrid optical waveguide exhibits one or more resonant properties.

11. The optical device according to claim 1 wherein said hybrid optical waveguide forms a portion of an integrated optical component selected from the group consisting of directional couplers, ring resonators, and multimode interferometers.

12. The optical device according to claim 1 wherein said hybrid optical waveguide forms a portion of an integrated optical component selected from the group consisting of amplifiers, lasers, nonlinear optical devices, acousto-optical devices, and multiwavelength sources.

13. The optical device according to claim 1 wherein at least a portion of said tellurium oxide layer is doped with a dopant capable of producing optical amplification when pumped.

14. The optical device according to claim 1 wherein said tellurium oxide layer is in direct contact with at least a portion of said silicon nitride waveguide.

15. The optical device according to claim 1 wherein an intermediate dielectric layer is provided between said tellurium oxide layer and said silicon nitride waveguide.

16. A method of forming an optical device, the method comprising:
providing a substrate having a dielectric layer thereon;
forming a silicon nitride waveguide on the dielectric layer; and
depositing a tellurium oxide layer over the silicon nitride waveguide, such that the tellurium oxide layer extends laterally in a planar configuration on either side of the silicon nitride waveguide while forming a conformal raised region over the silicon nitride waveguide, thereby forming a hybrid optical waveguide.

17. The method according to claim 16 further comprising patterning the silicon nitride waveguide prior to depositing the tellurium oxide layer such that the hybrid optical waveguide comprises one or more resonant properties.

18. The method according to claim 16 further comprising doping at least a portion of the tellurium oxide layer with a dopant.

19. The method according to claim 16 further comprising depositing an intermediate dielectric layer on the silicon nitride waveguide prior to depositing the tellurium oxide layer.

20. The method according to claim 16 wherein the tellurium oxide layer and the silicon nitride waveguide are formed with dimensions such that over at least a portion of the near-infrared, the hybrid optical waveguide is capable of guiding a single optical mode that resides predominantly within the conformal raised region of the tellurium oxide layer.

21. An optical device comprising:
a substrate;
a first dielectric layer formed on said substrate, said first dielectric layer having a refractive index less than that of silicon nitride;
a silicon nitride waveguide formed on said first dielectric layer; and
a metal oxide layer conformally disposed over said silicon nitride waveguide such that said metal oxide layer extends laterally in a planar configuration on either side of said silicon nitride waveguide while forming a conformal raised region over said silicon nitride waveguide, such that said metal oxide layer and said silicon nitride waveguide form a hybrid optical waveguide.

* * * * *